May 6, 1958　　A. B. POSCHEL　　2,833,193
PHOTO-ENGRAVING APPARATUS FOR PRINTING CYLINDERS
Original Filed May 18, 1953　　5 Sheets-Sheet 1
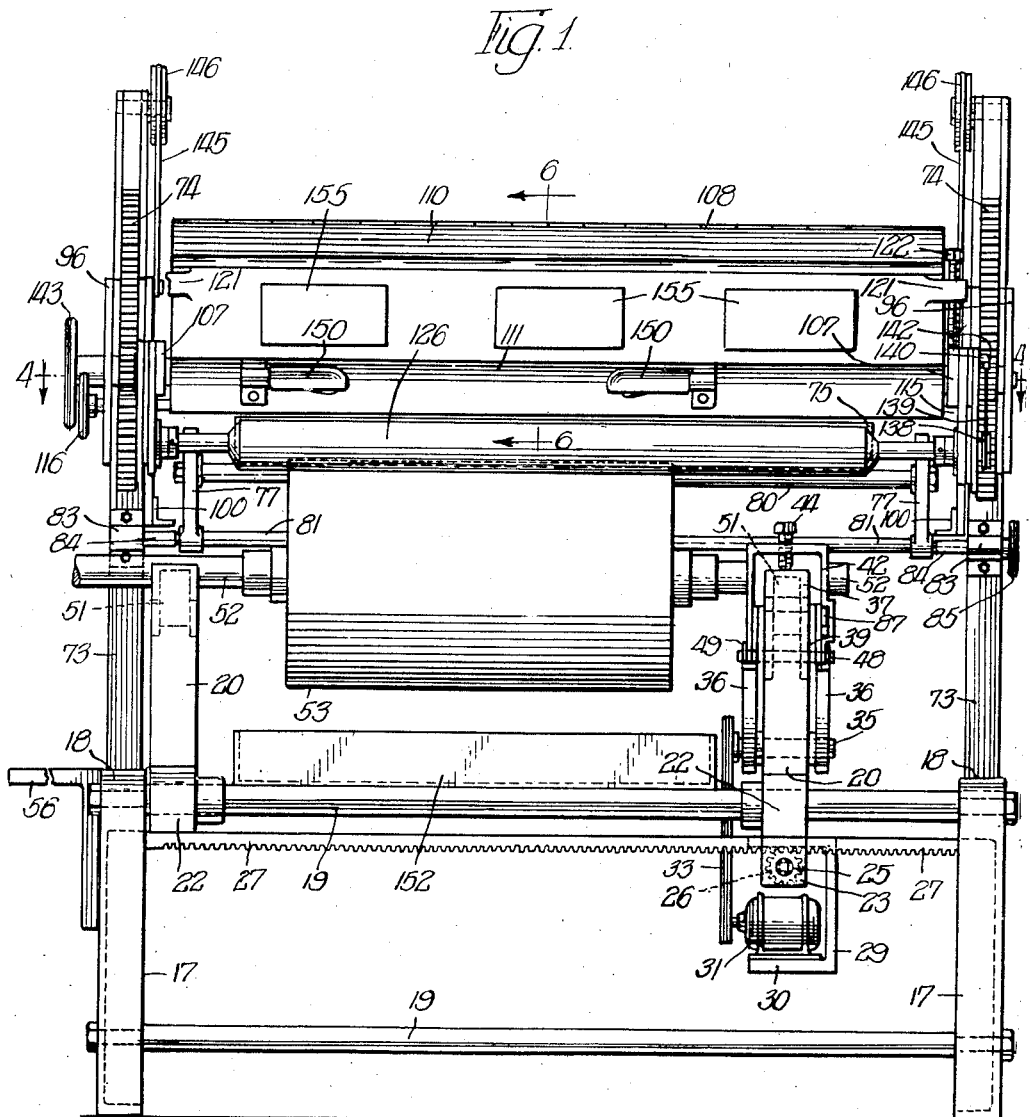
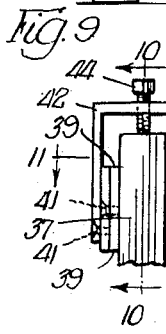
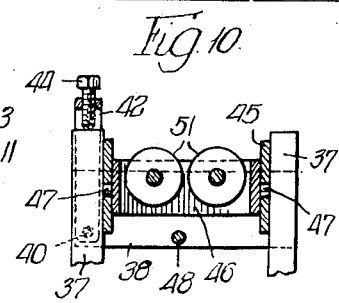
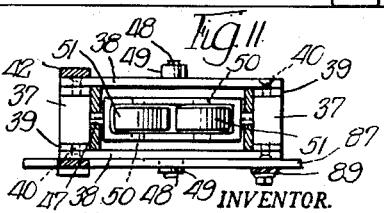
INVENTOR.
Alfred B. Poschel,
BY

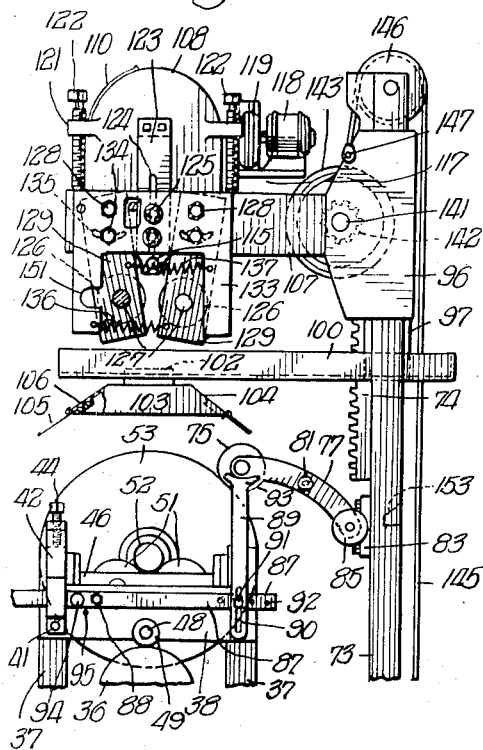
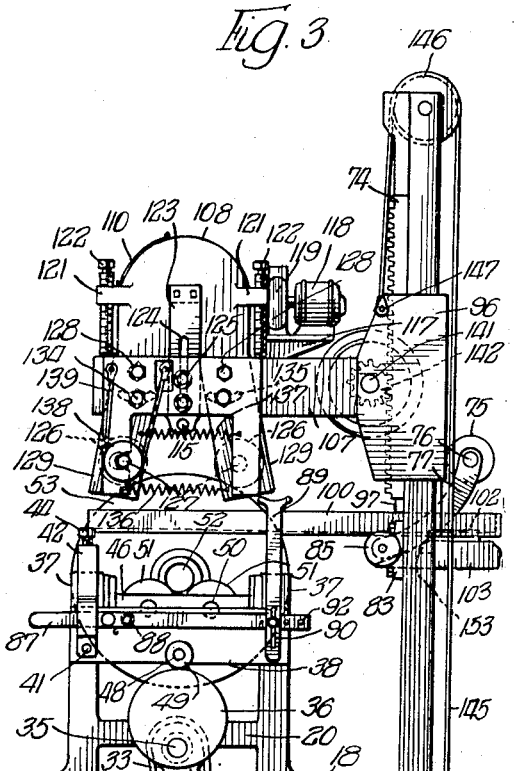
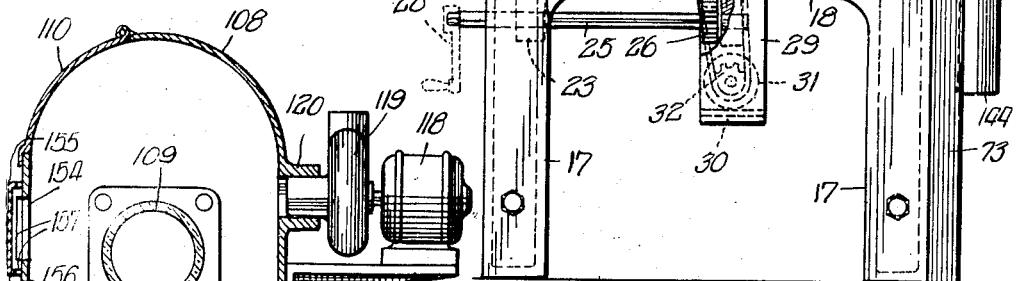
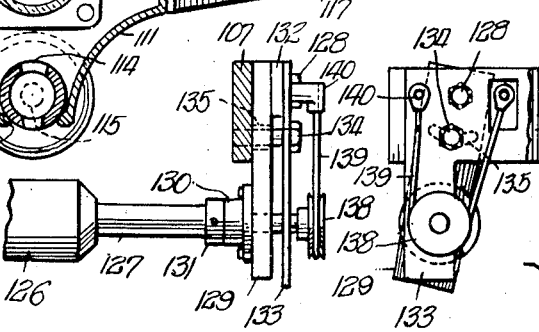

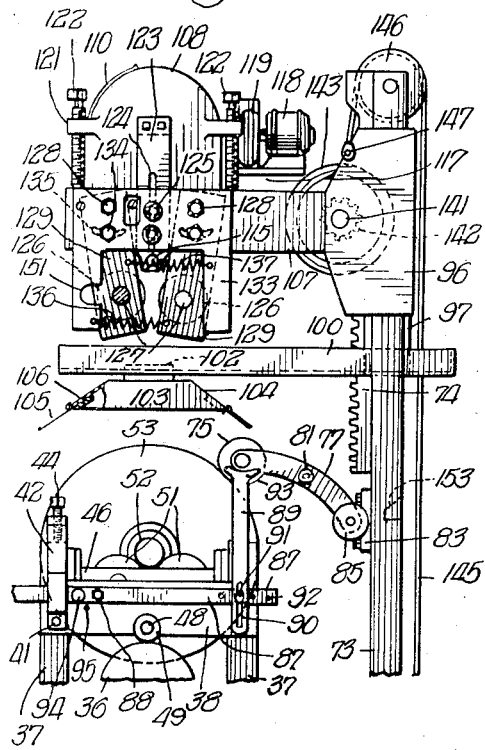

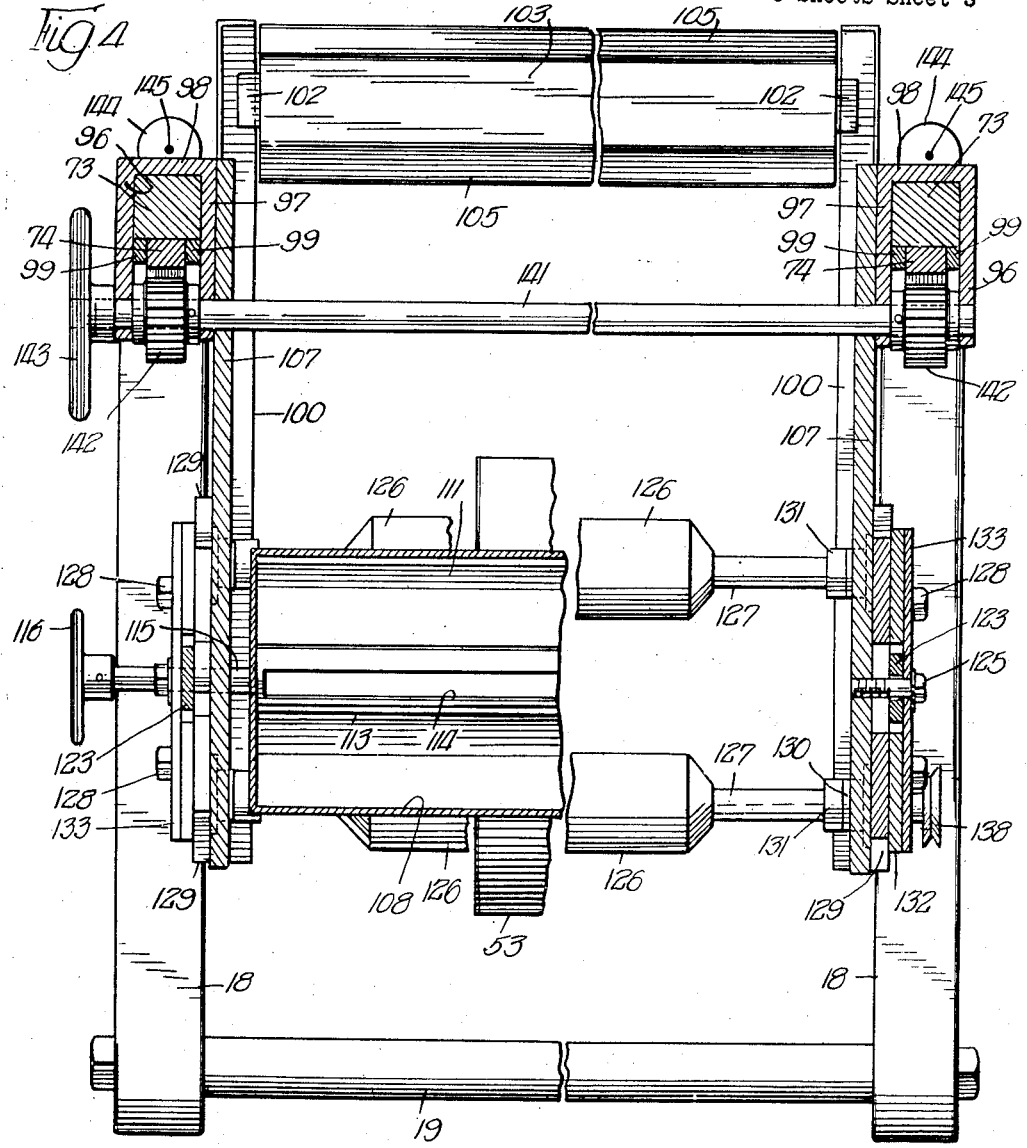

May 6, 1958 A. B. POSCHEL 2,833,193
PHOTO-ENGRAVING APPARATUS FOR PRINTING CYLINDERS
Original Filed May 18, 1953 5 Sheets-Sheet 4

INVENTOR.
Alfred B. Poschel,
BY

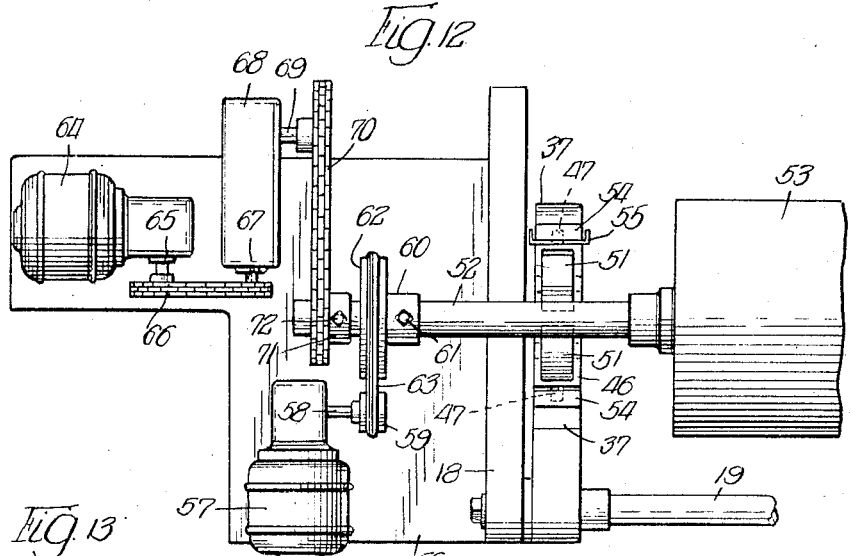

United States Patent Office 2,833,193
Patented May 6, 1958

2,833,193

PHOTO-ENGRAVING APPARATUS FOR PRINTING CYLINDERS

Alfred B. Poschel, Chicago, Ill., assignor to The Meyercord Co., Chicago, Ill., a corporation of Illinois Original application May 18, 1953, Serial No. 355,691. Divided and this application November 4, 1954, Serial No. 466,877

7 Claims. (Cl. 95—77.5)

This is a division of the application filed May 18, 1953, Serial No. 355,691, now Patent No. 2,766,719.

The present invention relates to photo-engraving apparatus for cylinders, and has for its main object the provision of a novel machine for preparation of intaglio or relief printing cylinders.

A further object of the present invention is the provision of a machine of the type indicated which would combine in one assembly several mechanical arrangements capable of accomplishing in succession all the steps necessary in the photo-engraving of cylinders, including the steps of applying to the cylinder of a photo-sensitive coating, photo-exposing or photo-copying, developing and etching. The present methods in the art of photo-engraving of cylinders contemplate the employment of separate machines for accomplishing the above named steps.

Another object of the present invention is the provision of a suitable apparatus for the production of multicolor halftone printing cylinders, especially intaglio, on level etched cylinders for rotary gravure printing, having impressed upon its surface by photographing means of designs very closely or endlessly joined, as for example allover wood or leather grains, marbles, textile patterns and other continuous designs. Hence, a further object of the present invention is the provision of a suitable apparatus for permitting the production upon printing cylinders of allover designs of the character indicated by the employment of a single etching which results in a more uniform etch, rather than the employment of two etching steps which heretofore have been necessary in connection with continuous designs.

A still further object of the present invention is the provision of a machine of the character indicated embodying several distinct mechanical arrangements, including the mechanism for cleaning and polishing the cylinder surface, another for applying to the cylinder surface of a light-sensitive coating, another for drying the said coating, another for positioning upon the cylinder and holding thereon under pressure and tension of a design-carrying film, and still another for copying upon the dry coating from the film of a design carried by the latter by the photoprinting process, including exposure of the film to light. The copied design upon the coating from the film aforesaid may be developed upon the cylinder without removing the latter from the machine.

A still further object of the present invention is the provision in a machine of the character indicated of a pair of suitable supports upon which the ends of the printing cylinder may be supported, with an agitating bearing supported by one of said supports for imparting to the cylinder a bodily angular shifting motion for facilitating a uniform spreading upon the cylinder of a photo-sensitive coating.

Another object of the present invention is the provision in a machine of the character indicated of a coating roller, which when in contact with the cylinder may be capable of spreading upon the printing cylinder of the light-sensitive coat as the same is applied to the cylinder by a brush or the like, said roller being intended as an alternative means to the above named agitating bearing for applying a uniform thickness of a photo-sensitive coating to the printing cylinder.

A still further object of the present invention is the provision of a suitable electric drier shiftably supported above the printing cylinder for drying the coat of the light-sensitive solution upon the cylinder, which drier may be shifted away when not in use and out of the path of the light and film pressing unit hereinafter mentioned.

Another object of the present invention is the provision in the machine of the character indicated of a light generating unit and film pressing unit, both disposed above the printing cylinder and supported thereabove for shifting movement to or away from the cylinder.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views;

Fig. 1 is a front elevational view of the present machine;

Fig. 2 is an end elevational view of the present machine showing the drier in an operative position with the printing cylinder, with the light and film pressing units in an inoperative positon;

Fig. 3 is an end elevational view of the present machine illustrating the light and film pressing units in an operative position with the printing cylinder;

Fig. 4 is a cross sectional view through the machine, on line 4—4 of Fig. 1;

Fig. 6 is an enlarged cross sectional view taken on line 6—6 of Fig. 1;

Fig. 7 is an edge elevational view of the mechanism for supporting a film engaging roller and for maintaining the same in a tensioned contact against the film during the photographic process, including a brake mechanism for retarding the speed of one roller;

Fig. 8 is the face elevational view of the mechanism last hereinabove mentioned;

Fig. 9 is the fragmentary edge elevational view of the support within which a movable bearing is supported for imparting to the printing cylinder shaft an agitating motion, including the mechanism for rendering the agitating means inoperative;

Fig. 10 is a cross sectional view taken on line 10—10 of Fig. 9;

Fig. 11 is a cross sectional view taken on line 11—11 of Fig. 9;

Fig. 12 is a top plan view of the opposite end of the shaft which supports the printing roller showing the detail of the bearing mechanism, and a pair of motors with transmissions therefrom for imparting a rotary movement to the shaft and the cylinder at two varying speeds;

Fig. 13 is a view similar to that of Fig. 7, showing details of the mechanism for vertically shifting the photolight casing to or away from the printing cylinder;

Fig. 14 is the side elevation of the mounting mechanism for a roller for spreading a photo-sensitive solution upon the printing roller;

Figure 5:
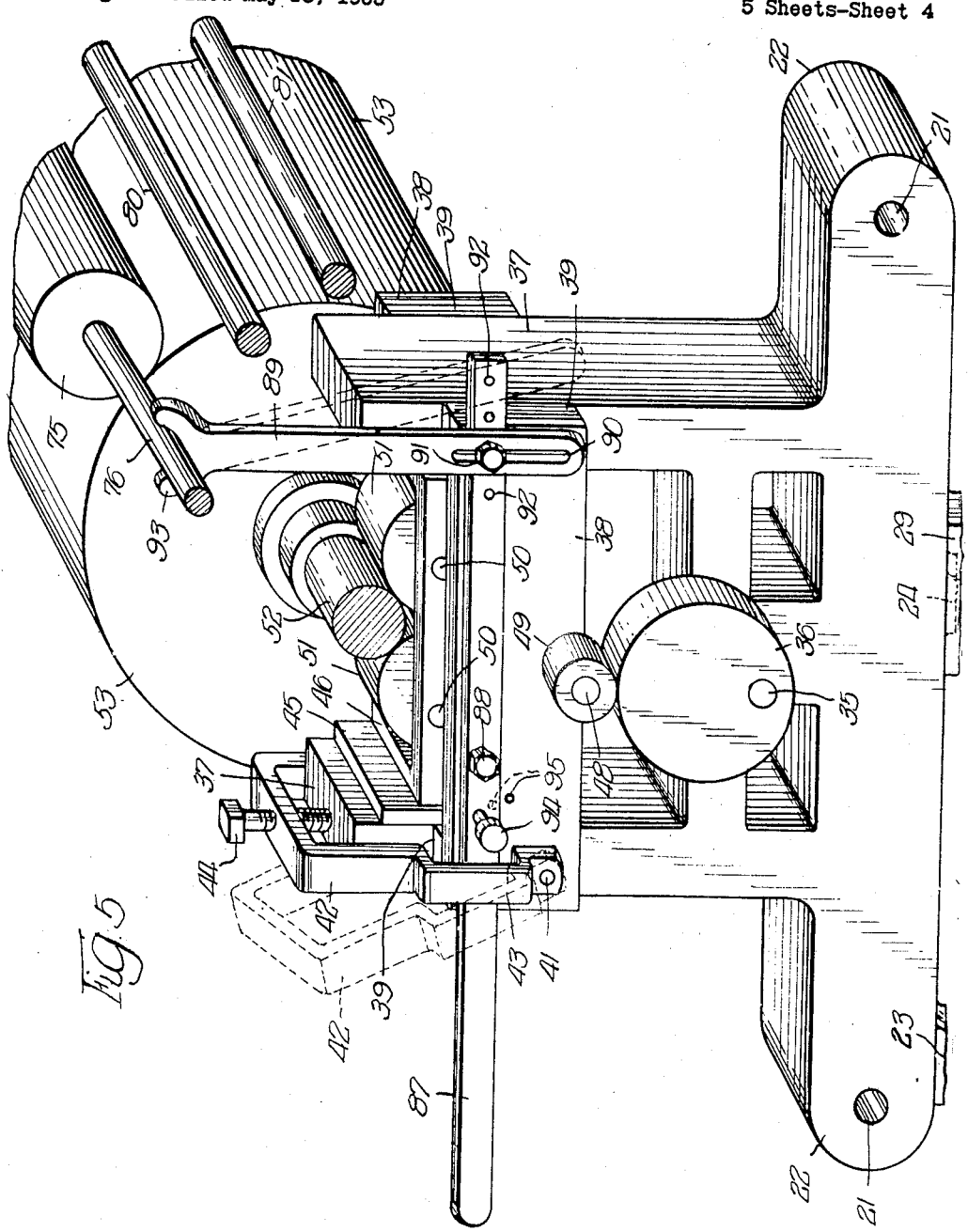
Fig. 5 is an enlarged perspective view of a support for one end of the shaft which carries the printing cylinder, also showing the agitating bearing for the printing cylinder.

Fig. 15 is a transverse cross sectional view, somewhat of a diagrammatical nature, showing the inception of enveloping a film around the printing cylinder covered with a photo-sensitive solution, together with the operative contacting position of a pair of tensioning rollers; and Fig. 16 is a similar view to that shown in Fig. 15, with a film in an advanced stage of enveloping around the printing cylinder, during the photographic process.

Referring in detail to the present drawings there is shown at each end of the machine a frame of a U-shaped inverted formation, including a pair of legs 17, connected at their upper ends by a horizontal frame member 18. The two frames are connected by a plurality of bars 19. Set upon a pair of the uppermost bars 19 is a pair of bearing supports 20, one of which is best shown in Fig. 5. The pair of said uppermost bars 19 pass through openings 21 made in base 22. Downwardly depending from base 22 of one of said bearing supports 20 is extension 23, and another extension 24, the two constituting bearings for shaft 25. Gear 26 is carried by said shaft 25, said gear meshing with toothed bar 27, the latter being supported by its ends upon the underfaces of the horizontal frame members 18. The end of said shaft 25 extends forwardly beyond the frame and is adapted to receive a crank handle 28 for imparting a rotary movement to gear 26 in order to cause the riding of said one bearing support 20 in a longitudinal direction upon said uppermost bars 19, for the purpose of adjusting said bearing support to the particular length of shaft upon which printing cylinder is supported, as will be hereinafter apparent.

Downwardly depending from said last named base 22 is plate 29, the lower end of which supports ledge 30 which constitutes a support for electric motor 31. The electric motor shaft supports sprocket wheel 32 over which an endless sprocket chain 33 is passed. The upper end of said sprocket chain 33 is passed over sprocket wheel 34 (Fig. 3), the latter being mounted upon one end of shaft 35. Adjacent each end said shaft 35 carries eccentric circular cam 36.

Each of said bearing supports 20 includes a pair of vertical posts 37, on the side faces of which plates 38 are positioned, and supported upon spacers 39, by means of screws 40 which are passed through said plates 38 and said spacers 39. Engaging a pair of said plates 38 by means of screws 41, passed through the free ends thereof, is an inverted U-shaped yoke 42. One side of said yoke 42 has offset 43, for the purpose hereinafter specified. The upper horizontal portion of said yoke 42 has screw 44 passed therethrough to bear against the upper end of one of said posts 37. Rigidly connected with either said spacers 39 or side plates 38 is a pair of inner plates 45 which are in contact with the inner faces of posts 37. Bearing box 46 is positioned within the rectangular space defined by side plates 38 and inner plates 45. It is observed that the sides of bearing box 46 are in a spaced relation with side plates 38, as is best shown in Fig. 11, while the ends of said box 46 are in a contactual relation with inner plates 45. The ends of said box 46 are provided with alined pins 47 defining a pivot for said box 46, permitting the latter to shift in a transverse direction when said box 46 is shifted in an upright direction with said plates 38 by the action of cams 36.

Passed through the lower edges of said side plate 38 is shaft 48, for supporting at each of its ends a cam follower 49, by virtue of which arrangement cams 36 may shift in an upright direction said plates 38 and the entire bearing assembly, including bearing box 46.

Supported within bearing box 46, upon shafts 50 is a pair of wheels 51, which may be either in contact, or slightly spaced away from each other for the purpose of supporting therebetween from an upper direction shaft 52 upon which printing cylinder 53 is mounted.

From the hereinabove description it will be apparent that when cams 36 rotate, the same bearing against followers 49 tend to shift the bearing assembly in an upright direction, thereby raising or lowering shaft 52 and cylinder 53 therewith. During this operation yoke 42 may be disengaged from post 37 and shifted to its inoperative position, shown in dotted lines in Fig. 5. The object of yoke 42 is to maintain the bearing assembly in such a position in which shaft 52 and cylinder 53 would remain in a horizontal position. Of course, when yoke 42 is in its operative position, in engagement with the upper end of post 37 through screw 44 the bearing assembly remains in its maximum upright shifted position with follower 49 in contact with the rise of cam 36 as seen in Fig. 5. Screw 44 may be adjusted in either direction so as to bring the bearing wheels 51 to a position to support shaft 52 horizontally. When yoke 42 is in an engagement with post 37 through screw 44 the bearing assembly is incapable of vertical shifting through cam 36. If desired each post 37 on that end of the machine may be provided with yoke 42.

The opposite end of shaft 52 has no such cooperating bearing shiftable in a vertical direction. It has however box 46 (Fig. 12) with wheels 51 journalled therewithin, and pivot pins 47 mounted within inserts 53, the latter being mounted upon the inner faces of posts 37 by any suitable means, said inserts being rigid with said posts 37. One end of said last named box has rigidly mounted thereon a U-shaped plate 55, the ends of which straddle one of said inserts 54, and limit the swivelled shifting motion of box 46 when the opposite end of shaft 52 is being shifted up and down by the vertically movable bearing hereinabove described. The action of said plate 55 is for the purpose of preventing unduly great shifting of the adjacent end of said shaft 52 and the consequent disconnecting therefrom of the rotary driving mechanism which will be presently described.

Supported upon the adjacent end of frame is ledge 56 which supports one electric motor 57. Shaft 58 is driven by said motor 57. Said shaft 58 carries pulley 59. Disengageably set upon the adjacent end of shaft 52, through the medium of collar 60 and screw 61 is pulley 62. Pulleys 59 and 62 are connected by belt 63. When screw 61 is tightened to rigidly engage collar 60 with said shaft 52, and motor 57 is in operation a rotary movement to shaft 52 and cylinder 53 is imparted, so that said cylinder 53 may be capable of making 40 to 100 revolutions per minute, the speed required when the photo-sensitive solution is applied to said cylinder 53 or when the imprint in the coating on cylinder 53 brought about by the photographic process is being developed.

Supported upon said ledge 56 is another electric motor 64 having shaft 65 carrying a rotary member over which sprocket chain or belt 66 is passed. The opposite end of said sprocket chain or belt 66 is passed over a similar rotatable member supported upon shaft 67. Said shaft 67 enters box 68 within which a series of reduction gears are located for the purpose of reducing the speed. Shaft 69 extending from said box 68 at the opposite end thereof, carries a pulley or a sprocket wheel over which a belt or sprocket chain 70 is passed. The opposite end of said belt or sprocket chain 70 connects with a rotary element rigidly connected with collar 71, the latter being mounted upon shaft 52 by means of screw 72.

The rotary movement from electric motor 64 and collar 71 is reduced considerably so as to cause cylinder 53 to rotate to the extent of approximately one inch per minute, the speed which is required for photographing the film upon the coat of photo-sensitive solution applied to cylinder 53. Of course, when motor 57 is in use screw 61 is tightened, with screw 72 completely loosened.

It will therefore be apparent that motors 57 and 64 are alternately used depending upon the degree of speed required in cylinder 53, and whichever motor is used its collar 60 or 71, respectively, is connected with shaft 52, while the remaining collar is disconnected and is made idle upon said shaft 52.

Rigidly affixed to the rear legs 17 is a pair of upright standards 73, the front edges of which, adjacent their upper ends, have rack bars 74 rigidly secured thereto.

As an alternative means for facilitating spreading of the solution of photo-sensitive material upon cylinder 53 roller 75 is employed. Said roller 75 is mounted upon shaft 76, the ends of which are mounted within the ends of arms 77. Keyed to each end of said shaft 76 is collar 78 (Fig. 14). Interposed between each collar 78 and the adjacent arm 77 is coil spring 79. Manual push exerted at either end of said roller 75 will cause the latter to oscillate in a longitudinal direction so as to properly spread the coating solution upon cylinder 53, when said roller 75 remains in contact therewith. The two of said arms 77 intermediately of their ends are rigidly connected by means of rod 80. The opposite ends of said arms 77 are supported upon the ends of rod 81. The ends of said rod 81 are provided with conical bores 82. Affixed to the front face of each standard 73 is strap 83 for supporting screw 84 shiftable in either direction by means of knob 85. The inner end of said screw 84 is provided with conical end 86 which enters into bore 82. When said conical end 86 is not fully driven into bore 82, as seen in Fig. 14, the same will provide a rather loose connection for said rod 81, thereby affording play to roller 75 in a transverse direction in order to make the same conform to the printing cylinder 53 for the purpose of uniformly spreading the coating solution thereon.

Of course, said roller 75 is an alternative means to the shiftable bearing hereinabove described. In order to adopt the use of said roller 75 for spreading of the coating solution upon cylinder 53 care should be taken that said cylinder remains in a horizontal position. This of course can readily be accomplished by raising or lowering the shiftable bearing, by adjusting screw 44 and stopping the operation of cams 36 by disconnecting electricity to motor 31. When shiftable bearing is employed, in that event roller 75 is rendered inoperative and out of contact with cylinder 53 by swinging the same with arms 77 away from said cylinder 53, the position shown in Fig. 3.

For the purpose of quickly lifting roller 75 from cylinder 53 in order to eliminate any streaks upon the latter, which otherwise might ensue due to the slow motion of said cylinder 53 and roller 75, suitable means for quickly lifting roller 75 from its contact with cylinder 53 are provided. Said means include a horizontal arm 87 in contact with outer plate 38. Intermediately of its ends said arm 87 is fulcrumed upon said plate 38 by means of screw 88 upon which said arm 87 is adapted for angular shifting movement in a vertical direction when the front end of said arm 87 is moved up or down. Vertical bar 89 at its lower end is provided with a longitudinal slot 90 for receiving therethrough screw 91. The latter is affixable within any one of the plurality of threaded bores 92 made in said arm 87 adjacent the rear end thereof. Offset 43 made in the outer side of yoke 42 accommodates said arm 87 and provides a clearance therefor. When the front end of arm 87 is brought down the rear end thereof will necessarily be elevated for the purpose of shifting shaft 76 in an upward direction, said shaft resting within the bifurcated upper end 93 of said bar 89. When said front end of arm 87 is brought to a desired downward position screw 94 is then driven into one of a plurality of openings 95 made in the outer side plate 38 for the purpose of locking said arm 87 to said plate 38 in an adjusted position.

The adjustments of roller 75 to or away from cylinder 53 may be had through the medium of slot 90 and screw 91, by virtue of which said bar 89 can be shifted in a vertical direction on loosening screw 91. When proper adjustment has been made screw 91 is tightened to maintain bar 89 in a rigid stationary relation. Further adjustments may be made by angularly shifting bar 89 forwardly or rearwardly for engaging screw 91 in any one of said bores 92, one of said latter positions of bar 89 being indicated by dotted lines in Fig. 5. When the front end of arm 87 has been brought to the lowermost position and screw 94 has been engaged with the lowermost opening 95, roller 75 will then remain out of contact with printing cylinder 53.

The drying, film pressing and photographic units are disposed above cylinder 53 and are movable upon standards 73 in a vertical direction to or away from said cylinder 53. The supporting and shifting mechanism for the said units upon said standards 73 includes a pair of yokes, each of which embodies outer plate 96 and an inner plate 97, the two plates in each yoke being connected by rear plate 98. It is noted that rack bar 74 is narrower than standard 73 so that side spaces between rack bar 74 and side plates 96 and 97 are filled by filler blocks 99, and of course are rigidly affixed to said plates 96 and 97. By virtue of this arrangement each yoke closely embraces each standard 73, permitting however a vertical sliding movement upon standard 73. Each of said inner plates 97 extends downwardly beyond the lower termination of each of said outer plates 96, and has attached at its lower end angle member 100 by means of a plurality of screws 101 (Fig. 13).

Positioned upon said angle members 100 by means of end tongues 102 is a drier including a trough-like member 103, having outwardly flaring walls 104 from which movable walls 105 project and with which the latter are hingedly connected.

The hinges upon which said movable walls 105 connect with walls 104 are spring-actuated so that said walls 105 are maintained in an outwardly flaring position corresponding to the incline of walls 104 when said walls 105 remain in an open position, as shown in Fig. 2. Said walls 105 are capable of folding upon said walls 104 as is seen in Fig. 4.

The drying unit adjacent the outer rim of each wall 104 is provided with a longitudinal electronic heating unit 106 (Fig. 2), the two of which when connected with a source of electricity generate heat for the purpose of drying the coat of a photo-sensitive solution upon cylinder 53 when said drying unit is disposed above cylinder 53, as is seen in Fig. 2. When the photographic unit is brought down toward cylinder 53 the drying unit is shifted rearwardly upon said angle members 100 to its inoperative position shown in Figs. 3 and 4, and out of the path of the photographic unit. The said drying unit can also be used as a cover for protecting cylinder 53 from the dust when it is desired that the coat upon the cylinder should dry naturally at a room temperature. In that latter use of said drying unit the electronic heating units 106 should not be connected with the source of electricity.

Rigidly affixed to the outer faces of inner plates 97 are supporting arms 107, within the front ends of which light casing 108 is supported. Supported within the end walls of said casing 108 is a mercury vapor tube 109, capable of generating intense light when connected with a source of electricity, for the purpose of playing upon the film in order to photograph impressions therefrom upon the photo-sensitive coating made on cylinder 53.

Said casing 108 adjacent the upper end thereof and at its front side is provided with door 110 providing access to the interior of said casing 108 for the purpose of affixing, removing or changing said mercury vapor tube 109.

The lower portion of said casing 108 includes a pair of converging walls 111, which by their lowermost terminations define oblong opening 112, within which tube 113 is positioned.

Said tube 113 is provided with a diametrical slot 114, including the upper wider portion and the lower narrower portion, through which light generated by tube 109 is adapted to pass and to play upon the film during the photographic process. It has been found that due to the action of the extreme heat upon tube 113 both portions of said slot 114 have a tendency to shrink. To counteract the shrinking effect, the two slot portions are narrower at their ends, gradually widening towards the center of said tube 113.

Said tube 113 at both of its ends terminates in a reduced shaft 115 which passes through end walls of casing 108 adjacent opening 112. One end of said shaft 115 has knob 116 affixed thereto for the purpose of turning said tube 113 in either direction for the purpose of either reducing the width of said slot 114 or for shutting off the same entirely.

Extending rearwardly from the rear wall of said casing 108 is ledge 117 for supporting thereon one or more motors 118 for operating one or more air fans 119. The latter connect with casing 108 through vents 120, for the purpose of exhausting from casing 108 the hot air generated by the lighted tube 109.

At each end of casing 108 there is a pair of ears 121 projecting from the end walls of said casing 108. Adjusting screws 122 are passed through said ears 121. The lower ends of said screws 122 rest upon the upper edges of said supporting arms 107.

As an additional means for supporting casing 108 there is at each end wall of casing 108 strip 123 attached thereto. Said strip 123 is provided with an oblong slot 124 through which one or more bolts 125 are passed therethrough to engage supporting arms 107.

The means for contacting the film with cylinder 53 and holding the same in a stretched spread relation around said cylinder during the photographic step of the operation of the machine by means of the light engendered by means of said mercury vapor tube 109, includes a pair of rollers 126 mounted upon shafts 127.

Mounted upon the outer face of supporting arm 107 in a pivotal relation by means of bolts 128 is a pair of swinging arms 129, each of which adjacent its lower end and on the inner face thereof carries in a rigid relation bearing 130 within which the ends of said shafts 127 are positioned (Fig. 13). Collars 131 keyed to said shafts 127 contact the adjacent ends of said bearings 130 and prevent the longitudinal movement of shafts 127 and rollers 126. Superimposed over said swinging arms 129 in a spaced relation by virtue of spacing block 132 is U-shaped plate 133. Said bolts 128 pass through said plates 133 adjacent the upper ends of the latter. For further affixing each of said plates 133 there are bolts 134 in a spaced relation with bolts 128 on vertical planes. Said latter bolts 134 also pass through said swinging arms 129, and are accommodated within arcuate slots 135 made in said swinging arms 129 for the purpose of obviating interference by said bolts 134 with the swinging movement of said swinging arms 129.

One of the downwardly depending edge portions of said U-shaped plates 133 is engaged by coil spring 136, while the opposite end of said coil spring 136 is engaged with the lower end of swinging arm 129 which is farthest removed from said downwardly depending edge portion of said U-shaped plate 133.

The opposite downwardly depending edge portion of said U-shaped plate 133 has a similar coil spring 137 engaging it by one of its ends, while the opposite end of said coil spring 137 engages swinging arm 129 which is farthest removed from said last named downwardly depending edge portion of said U-shaped plate 133. Said coil springs 136 and 137, being under tension, exert pulling actions upon their respective swinging arms 129 shifting the lower ends of said arms 129 towards each other, as seen in Fig. 2.

The action of said springs 136 and 137 shifts of course shafts 127 and rollers 126 towards each other to their inoperative position shown in Fig. 2.

The mounting and shifting means for said rollers 126 hereinabove described, including a pair of swinging arms 129 are of course provided at each end of the machine.

It has been found that when both rollers 126 rotate at the same rate of speed, the film has a tendency to buckle at its portion disposed between said rollers. To prevent the tendency of the film to buckle the front roller 126, that is the roller which first engages the film, as seen in Fig. 15, is provided with a suitable brake to retard the speed of that roller. The brake, best shown in Figs. 7 and 8, includes pulley 138 keyed to the end of shaft 127 of that last mentioned roller 126, which end is extended beyond the plane of the U-shaped plate 133. A taut cord 139 is passed over said pulley 138, with the ends of said cord permanently or disengageably affixed to pins 140 mounted in the upper portion of said U-shaped plate 133. Suitable tightening buckle may be provided upon cord 139 to regulate the degree of pressure thereof upon pulley 138. With the relation of rotation of cylinder 53 the right-hand roller 126 as viewed in Figs. 15 and 16, is the advance roller, while the other roller 126, provided with the said brake is the rear roller, notwithstanding the fact that said last named roller 126 is forwardly of the machine and that it first engages the film.

The mechanism for raising or lowering angle members 100, rollers 126 and the light emission unit, including casing 108, includes shaft 141 mounted within the front edges of plates 96 and 97, said edges being extended forwardly beyond rack bars 74. Keyed to the ends of said shaft 141 is a pair of gears 142 positioned intermediately of plates 96 and 97 at each end of the machine. Said gears mesh with the teeth of rack bar 74. At one end said shaft 141 is provided with wheel handle 143 by means of which a rotary movement may be imparted to said shaft 141 in either direction for the purpose of shifting the yokes including plates 96, 97 and 98 together with supporting arms 107 upon standards 73 vertically in either direction.

To counterbalance the weight of the three vertically shifting units aforesaid in order to facilitate easier sliding of the yokes upon standards 73 and easier operation of wheel handle 143, counterweights 144 are provided. Said counterweights are suspended upon the ends of cords 145, rearwardly of standards 73. Said cords 145 are passed over pulleys 146. The opposite ends of said cords 145 are in any suitable manner affixed to the yokes intermediately of plates 96 and 97 at each end of the machine, as at 147.

Referring now more particularly to Figs. 15 and 16, after the photo-sensitive solution has been coated upon cylinder 53 and dried thereon by the drier, one end of film 148 is affixed to the cylinder by means of a Scotch or like tape 149. Thereupon rollers 126 are brought down, the right hand roller 126 in contact with cylinder 53, and the left hand roller in contact with film 148, with tape 149 remaining intermediately of said two rollers 126, as seen in Fig. 15, of course assuming that the direction of rotation of cylinder 53 shall be in the clock-wise direction as viewed in Figs. 15 and 16 and there indicated by arrows. As soon as tape 149 has been applied to the end of film 148, with the end of the film and said tape disposed intermediately of said rollers 126 the operation of motor 64 is started with collar 71 rigidly engaged with shaft 52 by means of screw 72, with collar 60 remaining idle upon that shaft. Due to the reduction of speed said motor 64 rotates cylinder 53 about one inch per minute. Immediately prior to the starting of said motor mercury vapor tube 109 is lit, with tube 113 in an operative position, that is with slot 114 disposed vertically and ready to pass the light therethrough upon film 148 as the same rotates with cylinder 53. The end of film 148 fastened by scotch tape 149 to cylinder 53 will of course eventually pass under the right hand roller 126 as said cylinder 53 rotates, so that both of said rollers 126 will exert pressure and spreading tension upon film 148 during the photographic process.

As soon as the end of film 148 fastened by Scotch tape 149 has passed the right hand roller 126 as viewed in Figs. 15 and 16, the Scotch tape 149 may then be removed with both ends of film 148 remaining free and unattached in any manner to cylinder 53. The tension upon the film exerted by rollers 126 will be sufficient to maintain said film 148 in an operative position upon cylinder 53 without any other fastening, until the photographic process has been completed. Of course, the tension of rollers 126 upon film 148 results from the action of coil springs 136 and 137 which tend to draw swinging arms 129 and with them rollers 126 towards each other. This tension of rollers 126 is along the chord of cylinder 53 drawn through the contact points of rollers 126 with film 148.

The front of the downwardly converging walls 111 is provided with a plurality of shaded light bulbs 150 in a longitudinal relation for providing light directed downwardly upon cylinder 53 so as to permit clear view upon the cylinder during some of the steps of operation.

The downwardly depending edge portion of said U-shaped plate 133 which is adjacent to the projecting end of shaft 127 past said plate is provided with slot 151 for providing clearance for the said projecting end of said shaft 127 while the adjacent roller 126 shifts to the operative position shown in Fig. 3.

Supportable upon bars 19 is tray 152 to selectively receive either cleaning solution for cylinder 53, developing solution for the photo-sensitive coat upon said cylinder or to receive the drippings from cylinder 53 as the above solutions are applied to the said cylinder.

On the inner faces of standards 73 stops 153 are provided to form rests for arms 77 when the same are thrown to an inoperative position shown in Fig. 3.

In the operation of the machine and process herein disclosed the first step is of course thorough cleaning of cylinder 53 with the usual mixture of whiting and water or the finest polishing paper in order to make sure that every trace of grease or dirt is removed.

The next step is the application to cylinder 53 of a light-sensitive colloid coating such as bichromated glue, gum, etc. The hereinabove description suggests several methods of applying the coating to the cylinder, one being the simultaneous rotation of the cylinder and application of an up and down movement at one end of the cylinder by means of cams 36. Another alternative mode of applying the coating to the cylinder is permitting roller 75 to contact the cylinder while coating to said cylinder is applied by brush or the like. The rotary movement of said roller 75 conjointly with the longitudinal movement thereof, which latter movement is permitted by coil springs 79, will facilitate a thorough coating of cylinder 53. As a third method of applying a coat to cylinder 53 a spray gun for ejecting of the light-sensitive coating in an atomized form against cylinder 53 may be used. However, in practice the use of roller 75 for spreading the coat upon cylinder 53 is the simplest mode. This latter mode requires a coating material of a somewhat higher viscosity than the other methods. An even and flawless coating of cylinder 53 is of great importance for the successful production and the quality of the final printing cylinder.

The applied coating upon the cylinder is then dried either at room temperature or by means of the electrical heating units 106 in the dryer unit aforesaid. During the use of the drying unit the cylinder of course is rotated.

After the coated cylinder has been completely dried and cooled to room temperature the transparent film 148, carrying the design to be copied and having been first properly opaqued and adjusted to the correct circumference of the cylinder, is then positioned upon the coat of the cylinder, with one end of the film affixed to the cylinder by means of Scotch tape 149 as was already described. After the correct position of the film around the cylinder has been ascertained, pressure rollers 126 and light casing 108 are lowered in position. The mercury vapor tube 109 and the air drawing fans 119 are set in operation by switching the electricity, and the exposure of the film and the coating thereunder to light is had through slot 114 in tube 113 as was hereinabove mentioned. At the same time the slow rotary motion of the cylinder is commenced through the operation of motor 64.

In order to produce a perfect photographic impression of the design in film 148 upon the coating on cylinder 53 it is important that there should be an intimate contact between the film and the coated surface of cylinder 53. It has been found that a thin layer of a viscous oil applied before the exposure between the coated cylinder and the film and squeezed along by the pressure rollers in the direction opposite to that of cylinder 53 will eliminate any air spaces and will bring about a perfect contact between the film and the coated cylinder.

When the exposure is a little more than half way around the cylinder completed, the adhesive tape 149 is pulled off, so that the front end of the film can drop away from the cylinder, and the back end of the film can then be squeezed by the pressure rollers in the correct space without interference and overlapping of the front end.

Thus a perfect joining up of the designs can be obtained in one exposure. The slow movement of the cylinder during exposure permits the pulling of the adhesive tape 149 without stopping the rotation of cylinder 53.

After the exposure has been completed around the circumference of cylinder 53 casing 108 and pressure rollers 126 are raised away from the cylinder. Then the film is removed. If any oil was used for bringing about a perfect contact of the film with the cylinder it should now be well washed off with a water-free solvent such as xylol.

The exposed cylinder is now ready for the developing of the design in the coating resulting from the photographic action. By the photo-chemical action of the light through the transparent areas of the film the corresponding areas of the colloid coating on the cylinder have been rendered insoluble in water or other suitable solvents and chemicals.

One type of developer which may be used consists of a saturated water-calcium-chloride solution to which a small percentage of a suitable acid such as lactic or hydrochloric has been added.

For the development of the photographic design impressed upon the coating on cylinder 53 the fast motor drive for the cylinder is connected. The actual developing is done by flowing the developer solution on the rotating cylinder and swabbing it with cotton until the design formed by the insoluble portions of the coating stand sharp on the bare copper of the cylinder surface. Upon completion of the development the developer is removed by the use of a very soft rubber squeegee while the cylinder is rotated. Any residue of the developer is washed off preferably with alcohol, which in turn is removed from the rotating cylinder with a very soft rubber squeegee.

The remainder of the developed coating on the cylinder is now an exact copy in reverse of the film design and forms an etch resisting stencil on the cylinder surface.

After any necessary retouching is done and the side margins of the cylinder are protected with asphaltum the cylinder is ready for the final operation which consists of etching. The etching can be done in the machine herein disclosed if the required precautions against the splashing of the corrosive etching fluids on the machine parts are taken. Normally however the cylinder should be lifted from the machine and put on a commonly used etching stand.

If of copper, the cylinder is etched with perchloride of iron solution of 46° Baumé, which is the preferred concentration, the application of which to the cylinder may vary from two to twenty minutes or even longer. The resulting etching is a one-level etching as compared to the result in conventionalal intaglio or gravure etching which is a several-level or depths etching. However different depths or level of etching, if needed can also be obtained with the above explained method by interrupting the etching from time to time and protectively staging out parts of the design which should have less depth.

Another method of obtaining different levels of etching depth consists of topping the one-level etched cylinder with an etch resisting ink which has wax or resins incorporated therein, then exposing the topped cylinder to heat while the cylinder is rotated. The result will be that the ink will partly melt and flow into the etched dot cells covering them varyingly depending on their size. The following etching will then act only on the opened portion of the heretofore etched dot cells and produce thereby a varying depth effect, especially if this operation is repeated several times. With skill very good results can be obtained.

Casing 108 at its upper portion, at its front wall and below door 110 is provided with a plurality of openings 154 (Fig. 6). These openings 154 are covered by baffle plates 155. Each of said plates 155 is provided at its rim with flange 156 which is in contact with the wall of said casing 108 and in a spaced relation with said openings 154. Said flange 156 adjacent each edge of baffle plate 155 is provided with opening 157 for permitting intake of air therethrough and through said openings 154 into said casing 108. By virtue of this arrangement a constant circulation of air in casing 108 is effected for the purpose of reducing the temperature in the said casing and preventing the scorching of the film during the photographic step of the process.

It is further observed that ledge 56 for supporting motors 57 and 64 could be eliminated, and the said motors could be supported upon base 22 of the left bearing support 20 as viewed in Fig. 1. Said last named base 22 and bearing support 20 could be hooked up with rack bar 27 for making said latter support movable.

In cylinders having short shaft 52 tubular extensions to engage the end of the shaft will permit the shaft to be supported within the bearings or will render the shaft capable to be engaged by collars 60 or 71.

It is further noted that the advance roller 126 rotates at the same speed as cylinder 53, while the other roller 126, due to the action of the brake has its speed reduced to provide a tensioning action on the film, and to prevent buckling or slackening of the latter as was hereinabove described.

The rearward roller 126 in lieu of the brake mechanism may be provided with an independent drive for imparting to the said roller a rotary motion in the same direction as the direction of rotation of cylinder 53. This modification would be as practicable as the brake mechanism for the purposes intended.

Mechanism may be provided to adapt motor 57 to drive collar 60 in either direction in order to impart a rotary movement to cylinder 53 also in either direction. This arrangement will facilitate different operations for preparation of the surface of said cylinder 53.

While there are described herein preferred embodiments of the present invention, it is nevertheless to be understood that minor changes may be made therein without departing from the spirit and scope of the invention as claimed.

What I claim as new is:

1. In a machine for photographing a design in a film upon a cylinder having a coat of a photo-sensitive solution upon its surface including a shaft upon which said cylinder is mounted, a pair of bearings upon which said shaft is supported, means for imparting a rotary movement to said shaft, a pair of standards, a pair of yokes mounted upon said standards for upright shifting movement, supports carried by said yokes, a casing enclosing a light source, said casing being mounted upon said supports and disposed above said cylinder, said casing including a pair of downwardly extending and mutually converging walls, said walls defining a slot, means for shifting said yokes upon said standards for bringing said casing to or away from said cylinder, the light emanating from said casing being adapted to be beamed through said slot upon the film when in a superimposed relation with the cylinder, and means for maintaining the portion of the film upon which the light beam is directed in a taut contactual relation with the coated surface of the cylinder.

2. In a machine for photographing a design in a film upon a cylinder having a coat of a photo-sensitive solution upon its surface including a shaft upon which said cylinder is mounted, a pair of bearings upon which said shaft is supported, means for imparting a rotary movement to said shaft, a pair of standards, a pair of yokes mounted upon said standards for upright shifting movement, supports carried by said yokes, a casing enclosing a light source, said casing being mounted upon said supports and disposed above said cylinder, said casing including a pair of downwardly extending and mutually converging walls, said walls defining a slot, means for shifting said yokes upon said standards for bringing said casing to or away from said cylinder, the light emanating from said casing being adapted to be beamed through said slot upon the film when in a superimposed relation with the cylinder, and means for maintaining the portion of the film upon which the light beam is directed in a taut contactual relation with the coated surface of the cylinder, said last named means including a pair of tensioned rollers adapted to contact the cylinder in a longitudinal relation therewith with the light beam directed intermediately of the contact points.

3. In a machine for photographing a design in a film upon a cylinder having a coat of a photo-sensitive solution upon its surface including a shaft upon which said cylinder is mounted, a pair of bearings upon which said shaft is supported, means for imparting a rotary movement to said shaft, a pair of standards, a pair of yokes mounted upon said standards for upright shifting movement, supports carried by said yokes, a casing enclosing a light source, said casing being mounted upon said supports and disposed above said cylinder, said casing including a pair of downwardly extending and mutually converging walls, said walls defining a slot, a slotted tube positioned within said slot, means for shifting said yokes upon said standards for bringing said casing to or away from said cylinder, the light emanating from said casing being adapted to be beamed through said slot in said tube upon the film when in a superimposed relation with the cylinder, a pair of pivoted arms supported on each of said supports adjacent each end of said casing, rollers carried by each pair of opposed arms, and tensioning means for normally tending to shift the pairs of said arms adjacent each end of said casing and said rollers towards each other, when said casing is shifted towards said cylinder on operation of said first named means, said rollers being adapted to contact the film and shift away from each other against the action of said tensioning means for maintaining a portion of the film disposed between said rollers in a taut contactual relation with the cylinder, the light beam passing through the slot in said tube being directed against the film at a point intermediately of the contact points of said rollers with the film.

4. In a machine for photographing a design in a film upon a cylinder having a coat of a photo-sensitive solution upon its surface including a shaft upon which said cylinder is mounted, a pair of bearings for supporting said shaft, means for imparting a rotary movement to said shaft, a casing enclosing a light source, said casing being supported in a spaced relation with said cylinder, said casing including a pair of downwardly extending and mutually converging walls for defining a slot, a slotted tube positioned within said slot, means for shifting said casing to or away from said cylinder, the light emanating from said casing being adapted to be beamed through the slot in said tube upon the film when in a superimposed relation with the cylinder, means for maintaining the portion of the film upon which the light beam is directed in a taut contactual relation with the coated surface of the cylinder, and means for rotatably turning said tube within the slot defined by said converging walls for selectively reducing the beam passing through the slot in said tube or for shutting off the same.

5. In a machine for photographing a design in a film upon a cylinder having a coat of a photo-sensitive solution upon its surface including a shaft upon which said cylinder is mounted, a pair of bearings for supporting said shaft, means for imparting a rotary movement to said shaft, a casing enclosing a light source, said casing being supported in a spaced relation with said cylinder, means for shifting said casing to or away from said cylinder, said casing being provided with a slot, the light emanating from said casing being adapted to be beamed through said slot upon the film when in a superimposed relation with the cylinder, supporting member adjacent each end of said casing, a pair of pivoted arms carried by said supporting member adjacent each end of said casing, rollers carried by each pair of opposed arms, and tensioning means for normally tending to shift the pairs of said arms adjacent each end of said casing and said rollers towards each other, when said casing is shifted towards said cylinder on operation of said second named means said rollers being caused to contact the film and shift away from each other against the action of said tensioning means for maintaining a portion of the film disposed between said rollers in a taut contactual relation with the cylinder, the light beam passing through the slot in said casing being directed against the film at a point intermediately of the contact points of said rollers with the film.

6. In a machine for photographing a design in a film upon a cylinder having a coat of photo-sensitive solution made upon its surface, means for supporting said cylinder for a rotary movement, a pair of supporting members, a pair of arms supported by one of their ends in a pivotal relation upon each of said supporting members, a pair of rollers, each of said rollers being journalled by its ends within the free ends of each opposed pair of said arms, tensioning means for urging the opposed pairs of said arms and said rollers toward each other, means for shifting said supporting members toward or away from the cylinder, when said supporting members have been shifted toward said cylinder on operation of said last named means said rollers being caused to contact the film and shift way from each other against the action of said tensioning means for maintaining a portion of the film disposed between said rollers in a taut contactual relation with the cylinder, and means for directing a light beam against the film at a point intermediately of the contact points of said rollers with the film for photographically transferring a design in the film to the coat of a photo-sensitive solution upon said cylinder.

7. In a machine for photographing a design in a film upon a cylinder having a coat of photo-sensitive solution made upon its surface, means for supporting said cylinder for a rotary movement, a pair of supporting members, a pair of arms supported by one of their ends in a pivotal relation upon each of said supporting members, a pair of rollers, each of said rollers being journalled by its ends within the free ends of each opposed pair of said arms for free rotary movement, tensioning means for urging the opposed pairs of said arms and said rollers toward each other, means for shifting said supporting members toward or away from the cylinder, when said supporting members have been shifted toward said cylinder on operation of said last named means said rollers being caused to contact with and bear against the film and shift away from each other against the action of said tensioning means for maintaining a portion of the film disposed between said rollers in a taut contactual relation with the cylinder, one of said rollers being the advance roller and the other of said rollers being the rearward roller with relation to the direction of rotation of said cylinder, means for directing a light beam against the film at a point intermediately of the contact points of said rollers with the film for photographically transferring a design in the film to the coat of photo-sensitive solution upon said cylinder, when said rollers bear against the film the same being adapted for a rotary movement during the rotation of said cylinder due solely to the frictional contact thereof with said cylinder through the film, and means for retarding the speed of rotation of said rearward roller.

References Cited in the file of this patent

UNITED STATES PATENTS

| | | |
|---|---|---|
| 1,344,896 | Jobke | June 29, 1920 |
| 2,190,948 | La Bombard | Feb. 20, 1940 |
| 2,581,136 | Pavelle | Jan. 1, 1952 |
| 2,616,344 | Patience | Nov. 11, 1952 |
| 2,617,338 | McMahon | Nov. 11, 1952 |